(12) United States Patent
Weyland

(10) Patent No.: US 9,796,014 B2
(45) Date of Patent: Oct. 24, 2017

(54) TOOL CONNECTION

(71) Applicant: TKR Spezialwerkzeuge GmbH, Gevelsberg (DE)

(72) Inventor: Thorsten Weyland, Schwerte (DE)

(73) Assignee: TKR Spezialwerkzeuge GmbH, Gevelsberg (DE)

( * ) Notice: Subject to any disclaimer, the term of this patent is extended or adjusted under 35 U.S.C. 154(b) by 527 days.

(21) Appl. No.: 14/383,467

(22) PCT Filed: Feb. 12, 2013

(86) PCT No.: PCT/EP2013/052766
§ 371 (c)(1),
(2) Date: Sep. 5, 2014

(87) PCT Pub. No.: WO2013/131721
PCT Pub. Date: Sep. 12, 2013

(65) Prior Publication Data
US 2015/0052720 A1   Feb. 26, 2015

(30) Foreign Application Priority Data
Mar. 6, 2012   (DE) .................. 10 2012 101 894

(51) Int. Cl.
*B21J 15/36* (2006.01)
*B25B 23/00* (2006.01)
(Continued)

(52) U.S. Cl.
CPC .............. *B21J 15/36* (2013.01); *B21J 15/02* (2013.01); *B21J 15/10* (2013.01); *B21J 15/18* (2013.01);
(Continued)

(58) Field of Classification Search
CPC ....... B23B 31/28; B23B 31/06; B23B 31/113; B25B 15/02; B25B 23/0035;
(Continued)

(56) References Cited

U.S. PATENT DOCUMENTS 2,271,803 A * 2/1942 Pfeiffer ................. B25B 21/004
173/93.7
2,373,886 A * 4/1945 Geiger .................... F16L 29/02
137/516.25
(Continued)

FOREIGN PATENT DOCUMENTS

CN        1140111 A       1/1997
CN     201154388 Y      11/2008
(Continued)

OTHER PUBLICATIONS

Translation of First Chinese Office Action date (8 pages), Aug. 25, 2015.

*Primary Examiner* — David B Jones
(74) *Attorney, Agent, or Firm* — Flaster/Greenberg P.C.

(57) ABSTRACT

The invention relates to a tool connection for arranging a riveting tool on a riveting tool receptacle, having a contact surface arranged on the riveting tool for supporting the riveting tool on a supporting surface arranged on the riveting tool receptacle. In order to provide a tool connection for arranging a riveting tool on a riveting tool receptacle, by means of which a repetitive riveting operation can be carried out without damage and it is particularly simple to replace the riveting tool, it is provided that a journal is arranged on one of the riveting tool or riveting tool receptacle and a journal receptacle is arranged on the other of the riveting tool or riveting tool receptacle, the journal can be introduced into and removed from the journal receptacle and the (Continued)

riveting tool can be releasably locked to the riveting tool receptacle by a magnetic force.

17 Claims, 5 Drawing Sheets

(51) Int. Cl.
| | | |
|---|---|---|
| *B23B 31/06* | (2006.01) | |
| *B21J 15/18* | (2006.01) | |
| *B25B 21/00* | (2006.01) | |
| *B21J 15/02* | (2006.01) | |
| *B21J 15/10* | (2006.01) | |
| *B23B 31/28* | (2006.01) | |
| *B23B 31/113* | (2006.01) | |

(52) U.S. Cl.
CPC ............ *B23B 31/06* (2013.01); *B23B 31/113* (2013.01); *B23B 31/28* (2013.01); *B25B 21/004* (2013.01); *B25B 23/0035* (2013.01); *B23B 2260/10* (2013.01); *Y10T 29/5373* (2015.01); *Y10T 403/7007* (2015.01)

(58) Field of Classification Search
CPC ......... B25B 21/004; B21J 15/02; B21J 15/18; B21J 15/10; B21J 15/36
USPC .................................................. 29/243.521
See application file for complete search history.

(56) References Cited

U.S. PATENT DOCUMENTS

| | | | | |
|---|---|---|---|---|
| 2,402,212 | A * | 6/1946 | Shaff ....................... | B21J 15/18 |
| | | | | 269/32 |
| 3,440,850 | A | 4/1969 | Friedrich | |
| 5,361,473 | A | 11/1994 | Landes | |
| 5,634,264 | A | 6/1997 | Dear et al. | |
| 5,992,206 | A | 11/1999 | Kühne | |
| 7,363,798 | B1 | 4/2008 | Nikkel | |
| 8,312,756 | B2 * | 11/2012 | Swinford ................. | B21J 15/02 |
| | | | | 29/243.53 |
| 2005/0036844 | A1 * | 2/2005 | Hirt ......................... | B25B 15/02 |
| | | | | 408/240 |
| 2006/0097464 | A1 * | 5/2006 | Strauch ............... | B25B 23/0035 |
| | | | | 279/75 |
| 2007/0033788 | A1 | 2/2007 | Chitty et al. | |
| 2009/0008886 | A1 * | 1/2009 | Shu ......................... | B23B 31/06 |
| | | | | 279/103 |
| 2010/0219593 | A1 | 9/2010 | Puzio et al. | |
| 2015/0052720 | A1 * | 2/2015 | Weyland ................ | B23B 31/28 |
| | | | | 29/243.521 |

FOREIGN PATENT DOCUMENTS

| | | |
|---|---|---|
| CN | 201659551 U | 10/2010 |
| DE | 1 552 838 | 11/1970 |
| DE | 20 2011 050 549 U1 | 12/2011 |
| DE | 20 2011 109 763 U1 | 6/2012 |
| EP | 0 835 701 A2 | 4/1998 |
| EP | 2 223 760 A1 | 9/2010 |

* cited by examiner

TOOL CONNECTION

BACKGROUND OF THE INVENTION

Field of the Invention

The invention relates to a tool connection for arranging a riveting tool on a riveting tool receptacle, comprising a contact surface arranged on the riveting tool for supporting the riveting tool on a supporting surface arranged on the riveting tool receptacle. The invention also relates to a riveting tool, a riveting tool receptacle and a riveting tool adapter.

Description of Related Art

When setting a rivet, the rivet is pressed with the help of a riveting tool. So-called riveting dies are usually used as the riveting tool, which apply high compressive forces to the rivet and thus shape the rivet heads. For this, different tools with riveting tool receptacles are known, which are designed for arranging the riveting tool. It is for example conventional to connect the riveting tools with pneumatically, hydraulically or also electrically operated tools with riveting tool receptacles.

In order to be able to securely transfer the high forces occurring during the riveting operation, the riveting tools normally lie in a planar manner, for example with a contact surface on a supporting surface arranged on the riveting tool receptacle.

For fixing the riveting tool on the riveting tool receptacle, the riveting tool is normally screwed with the riveting tool receptacle, wherein in the screwed in position the contact surface and the supporting surface are in contact.

With the increasing period of use of the tool, a loosening of the screwed connection can result due to the high forces occurring during the riveting operation, as a result of which the contact surface and the supporting surface are no longer in contact. This leads to the fact that the occurring forces can no longer be transferred via the contact surface and the supporting surface during a subsequent riveting operation, but rather solely via the screwed connection. However, in many cases, this leads to deformations of the riveting tool, the riveting tool receptacle or even to a break-away of the screwed connection from the riveting tool. The hereby occurring damage to the tool, the riveting tool receptacle and/or the riveting tool are considerable and can often only be repaired in a very cost- and time-intensive manner.

Furthermore, a screwed connection does not permit a quick change process of the riveting tool and even slight deformations to the connection can make repairs considerably more difficult.

BRIEF SUMMARY OF THE INVENTION

Thus, the object of the invention is to provide a tool connection for arranging a riveting tool on a riveting tool receptacle, a riveting tool, a riveting tool receptacle and a riveting tool adapter, by means of which a repetitive riveting operation can be carried out without damage and it is particularly simple to replace the riveting tool.

The object is solved by a tool connection for arranging a riveting tool on a riveting tool receptacle, comprising: a contact surface arranged on the riveting tool for supporting the riveting tool on a supporting surface arranged on the riveting tool receptacle, wherein a journal is arranged on one of the riveting tool or riveting tool receptacle and a journal receptacle is arranged on the other of the riveting tool or riveting tool receptacle and the journal can be introduced into and removed from the journal receptacle and the riveting tool can be releasably locked to the riveting tool receptacle by a magnetic force; a riveting tool for arranging on a riveting tool receptacle, comprising: a journal which has a journal projection protruding radially with respect to a journal longitudinal axis and rotating around the journal in a maximally annular manner or a journal receptacle with a maximally annual circumferential undercut; a riveting tool receptacle for arranging a riveting tool, comprising: a journal which has a journal projection protruding radially with respect to a journal longitudinal axis and surrounding the journal in a maximally annular manner or a journal receptacle with a maximally annual circumferential undercut, a receptacle magnet is arranged on the riveting tool receptacle; and a riveting tool adapter for connecting a riveting tool with a riveting tool receptacle, comprising: an adapter journal arranged on a first end of the riveting tool adapter with an adapter journal projection protruding radially with respect to an adapter journal longitudinal axis and surrounding the adapter journal in a maximally annular manner and/or an adapter journal receptacle arranged on a second end of the riveting tool adapter lying opposite the first end with a maximally annular circumferential adapter undercut. Advantageous further embodiments of the inventions are specified in the dependent subclaims.

The tool connection according to the invention for arranging a riveting tool on a riveting tool receptacle has a contact surface arranged on the riveting tool for supporting the riveting tool on a supporting surface arranged on the riveting tool receptacle, wherein a journal is arranged on the one of the riveting tool or riveting tool receptacle and a journal receptacle is arranged on the other of the riveting tool or riveting tool receptacle and the journal can be introduced into and removed from the journal receptacle and the riveting tool can be releasably locked to the riveting tool receptacle by a magnetic force.

The used magnetic force according to the invention enables a secure locking of the riveting tool on the riveting tool receptacle and thereby prevents in the operating direction of the riveting tool a position change of the riveting tool with respect to the riveting tool receptacle. The tool connection according to the invention thus enables even in the case of repetitive use of the riveting tool a permanent and secure resting against each other of the supporting and contact surface, whereby in the case of the riveting operation a deformation or damage to the tool, the riveting tool or the riveting tool receptacle is prevented.

The replacement of the riveting tool, for example due to wear or in the case of a necessary shape change of the riveting tool, is possible in a particularly simple manner through the releasable locking. During the changing of the riveting tool, the tool connection according to the invention thereby reliably prevents a wrong arrangement of the new riveting tool, which can otherwise result in damage during the riveting operation.

Instead of the riveting tool, for example riveting tool adapters, which serve to arrange alternative riveting tools on the tool, can be connected with the riveting tool receptacle.

The supporting surface and the contact surface are advantageously coordinated with each other and positioned so that the two surfaces rest against each other in a planar manner and the operating direction of the riveting tool progresses perpendicularly, i.e. at an angle of 90° to the two surfaces (contact surface and supporting surface). The contact and supporting surfaces are in contact with each other and, during the riveting operation, a transfer of force takes place from the riveting tool receptacle to the riveting tool via the adjacent surfaces.

The journal and the journal receptacle are designed in a corresponding manner, i.e. the journal receptacle is designed to receive the journal. The journal and/or the journal receptacle thus particularly preferably has a round and/or oval cross-section. However, angular i.e. polygonal cross-sections are also possible.

The journal and the journal receptacle can be designed both on the riveting tool as well as on the riveting tool receptacle. However, the journal is particularly advantageously formed on the riveting tool and the journal receptacle on the riveting tool receptacle.

The term "lockable" in terms of the invention is a connection of the riveting tool to the riveting tool receptacle, which prevents during operation an automatic releasing of the riveting tool from the riveting tool receptacle and is releasable in a non-destructive manner. This means that the riveting tool can be removed for example by hand from the riveting tool receptacle. However, the riveting tool can in no way fall out of the riveting tool receptacle.

According to a further embodiment of the invention, the riveting tool can be adjusted between an insertion position, in which the journal can be completely introduced into the journal receptacle and can be removed from it, and a use position, in which the journal is fixed in the journal receptacle in the journal longitudinal axis direction.

The insertion position thus represents for example the position, in which the journal is completely introduced into the journal receptacle and from which it is adjustable, for example tippable, pivotable, but preferably rotatable from the journal into the use position. In the insertion position, only the magnetic force thus preferably acts for locking the journal on the journal receptacle.

In the use position, in addition to the locking by the magnetic force, another fixation of the journal on the journal receptacle takes place in the journal longitudinal axis direction, through which a removal of the journal from the journal receptacle is blocked.

For establishing the releasable locking by means of the magnetic force, according to a further embodiment of the invention, the riveting tool and/or the riveting receptacle is designed at least partially ferromagnetically and a tool magnet is arranged on the riveting tool and/or a receptacle magnet is arranged on the riveting tool receptacle.

The ferromagnetic design can take place for example through the arrangement of a ferromagnetic body on the riveting tool and/or on the riveting tool receptacle. However, the riveting tool and/or the riveting tool receptacle itself are preferably made of a ferromagnetic material. In any case, a tool magnet or respectively receptacle magnet is arranged on one of the riveting tool or riveting tool receptacle and the other of the riveting tool and/or riveting tool receptacle is designed at least partially ferromagnetically. Both the riveting tool receptacle as well as the riveting tool are preferably designed ferromagnetically.

The arrangement of the tool magnet on the riveting tool or respectively the arrangement of the receptacle magnet on the riveting tool receptacle can take place in different manners. For one, the riveting tool and/or the riveting tool receptacle can be designed as a magnet. It is also possible to design the tool magnets and/or the receptacle magnets separately and to arrange them in the riveting tool and/or the riveting tool receptacle and under the respective surface of the contact surface/supporting surface.

However, the tool magnet is particularly preferably at least partially arranged in the contact surface and/or the receptacle magnet at least partially in the supporting surface. This means that a magnet introduced into the riveting tool or into the riveting tool receptacle is integrated into the surface of the contact surface or respectively into the surface of the supporting surface and is thus part of it, whereby the effective magnetic forces are used particularly advantageously and the magnets can be designed in a particularly small manner.

It is freely selectable whether a tool magnet or a receptacle magnet or both a tool magnet as well as a receptacle magnet are arranged and depends above all on the necessary magnetic force for the releasable locking of the riveting tool on the riveting tool receptacle. The size and strength of the respective magnets are also freely selectable. Thus, special neodymium magnets can be used for example as the tool magnets and/or receptacle magnets.

According to a further embodiment of the invention, the tool magnet and/or the receptacle magnet is positioned such that the tool magnet in the use position exerts a force of magnetic attraction on the supporting surface and/or the receptacle magnet in the use position exerts a force of magnetic attraction on the contact surface.

The riveting tool is thus also releasably locked in the use position via the magnetic force in addition to the fixation via the journal on the journal receptacle. A particularly secure contact of the contact surface on the supporting surface in the use position can hereby be ensured.

The tool magnet is particularly preferably arranged in the contact surface such that it is in a magnetic operative connection with the receptacle magnet in the insertion position of the journal into the journal receptacle.

This means that the receptacle magnet and the tool magnet, in the case of a journal pushed into the journal receptacle in the journal longitudinal axis direction, are directly adjacent, if applicable in contact or arranged at least along a longitudinal axis and only separated from the surfaces of the contact surface and/or supporting surface.

More than one magnet, for example two magnets per contact/supporting surface, is preferably respectively arranged in the contact and/or the supporting surface. These are preferably arranged diametrically on the journal or respectively on the journal receptacle.

In order to increase the magnetic operative connection, for example three, four or more magnets (tool magnets and/or receptacle magnets), which are preferably positioned evenly with respect to each other, are arranged per surface (contact surface and supporting surface).

In order to enable a particularly simple changing of the riveting tool, the tool magnet and the receptacle magnet are to be arranged with respect to each other such that the receptacle magnet and the tool magnet push away from each other in the insertion position in operative connection. As soon as the two magnets are in operative connection, i.e. their magnetic forces are in interaction, the riveting tool is advantageously pressed out of the riveting tool receptacle and the removal of the riveting tool is possible in a particularly simple manner. Furthermore, the magnetically repelling effect during insertion of the riveting tool into the riveting tool receptacle has a particularly advantageous displacement effect, which turns the riveting tool with respect to the riveting tool receptacle around the journal longitudinal axis from the insertion position into a use position.

Added to this is the fact that a twisting of the riveting tool on the riveting tool receptacle into the insertion position is also prevented during operation of the riveting tool since the repelling operative connection prevents a twisting of the tool magnets generated by the operation of the riveting tool up into the repelling operative connection.

Different pressing molds are often used for the riveting die, i.e. the riveting die has a specific recess, which presses the rivet head into a special mold during the pressing. For example depending on the shape of the recess, a particularly strong adhesion of the rivet head to the riveting die can hereby take place so that when trying to release the riveting die from the pressed rivet head, the riveting die remains stuck to the rivet head. In the case of very strong adhesive forces, it thus happens that the magnetic force locking the riveting die on the tool receptacle is insufficient when trying to release the riveting die from the rivet head and the riveting die is pulled out of the riveting tool receptacle against the magnetic force.

According to a further embodiment of the invention, the tool connection has a journal projection protruding radially with respect to a journal longitudinal axis and surrounding the journal in a maximally annular manner, and an undercut surrounding the journal in a maximally annular manner, wherein, in the use position of the journal, the projection is located in the journal longitudinal axis direction in operative connection with the undercut.

The preferred embodiment secures the riveting die in a particularly advantageous manner from being pulled out of the riveting tool receptacle in the case of axial forces that are greater than the magnetic force.

The journal projection can be designed in a different manner, for example as a rod, which penetrates the journal and protrudes out of the journal longitudinal axis. The journal projection can also be designed as an end cap of the journal, i.e. as a cover closing a journal end, which protrudes over the journal cross-section. The journal can advantageously be designed as a plane or surface at least partially surrounding the journal.

An undercut is understood as a projection designed transversely to the journal receptacle longitudinal axis direction. The undercut can be made of the journal receptacle itself, for example through a cutting process, but is advantageously designed by an additional undercut body arranged in or on the journal receptacle.

The undercut surrounds the journal receptacle a maximum of one time according to the journal projection. The shape of the undercut is thereby advantageously adapted to the shape of the journal projection.

A journal projection/undercut surrounding in a maximally annular manner is understood as a journal projection/undercut, which surrounds the journal/the journal receptacle by a maximum of 360°. A journal/a journal receptacle without threads is thus designed.

The arrangement and the positioning of the undercut on the journal receptacle and of the journal projection on the journal takes place such that, in the use position of the journal, the projection in the journal longitudinal axis direction is in operative connection with the undercut, i.e. the journal is fixed on the journal receptacle.

An operative connection (fixed) is also understood for example as an overlapping of the journal projection with the undercut in the journal longitudinal axis direction. The operative connection can also be designed in a contact-free manner, i.e. there is no direct contact in the journal longitudinal axis direction between the journal projection or a part of the journal projection and the undercut and/or the contact first happens during operation.

This results in that a design is also alternatively possible in which the journal projection and the undercut are at least in contact in the use position.

The alignment of the journal projection, in this case the angle between the journal projection or at least one surface of the journal projection and the journal longitudinal axis, is between 45° and 135°, advantageously 90°+2°.

The journal can also have several surfaces, for example one upper surface aligned in the direction of a riveting tool head and one lower surface aligned in the direction of the journal end, which thus overlap in the journal longitudinal direction, wherein the lower surface has for example a 90° angle to the journal longitudinal axis and the upper surface is arranged with an angle <90° or an angle >90° to the journal longitudinal axis.

The journal projection particularly preferably has a contact surface, which has a slope with respect to the journal longitudinal axis. In this connection, a slope is an angle between the contact surface and/or the journal projection and the journal longitudinal axis, which is not 90°.

Thus, the journal projection or at least one surface of the journal projection designed as a contact surface can be designed as a journal projection/contact surface surrounding the journal in a spiral manner, wherein the journal projection extends a maximum of one time, i.e. 360° around the journal.

The size of the journal projection, i.e. the height (in the direction of the journal longitudinal axis), the width (transversely to the journal longitudinal axis) or the length of the journal projection is adaptable to the technical requirements. The journal projection advantageously surrounds the journal at an angle of 90°±10°. This means that the width of the journal projection advantageously corresponds to a width/a diameter of the journal.

The alignment of a contact surface with slope makes it possible to establish a clamp connection between the contact surface and the contact/supporting surface, which enables a permanent fixation of the riveting tool on the riveting tool receptacle. Due to the fact that, also in the case of this type of design, the clamping direction is against the operating direction of the riveting die, damage to the tool connection due to the high forces during the riveting operation continues to be excluded and a secure contact is ensured between the contact surface and the supporting surface.

In order to achieve a particularly high security against the journal being pulling out of the journal receptacle in the use position, according to a further embodiment of the invention, at least two radially spaced journal projections protruding from the journal, which surround the journal in a jointly maximally annular manner, are preferably arranged in a plane progressing mainly perpendicular to a journal longitudinal axis.

The distance between the journal projections can be selected in any manner. Thus, the journals can be arranged for example opposite each other and at an even distance with respective to each other around the journal. An even distance is also preferred between the journals in the case of the arrangement of more than two projections.

The journal projections preferably progress in one plane around the journal. The angle between the plane and the journal longitudinal axis preferably is between 45° and 135°, advantageously around 90°+2°.

In the case of the arrangement of several journal projections, the respective contact surfaces can also have different slopes with respect to the journal longitudinal axis.

Two journal projections are particularly preferably arranged diametrically on the journal, both of which correspond if applicable at least partially with the width of the journal. It is also possible that the two journal projections together only cover for example 180°, 150°, 120° or 90°.

The joint width of several journal projections arranged around the journal, i.e. the angle covered by the journal projections surrounding the journal, is a maximum of 360°, i.e. they are once annular circumferential, wherein the respective journal projections can also be designed with different widths.

The undercut can take place for example as one piece with the riveting tool receptacle or also through separately designed undercut bodies. The undercut is particularly advantageously formed by a bolt protruding into the journal receptacle.

The bolt is preferably designed round, wherein other cross-sectional shapes are also conceivable. However, round bolts can be pushed and clamped particularly easily in holes bored for example from outside into the riveting tool receptacle, which extend in sections through the journal receptacle, so that the bolt forms the undercut in the journal receptacle.

The bolt thereby extends particularly preferably transversely to the longitudinal axis of the journal receptacle. The alignment of the bolt thus preferably takes place at an angle of 90° to the longitudinal axis of the journal receptacle. However, transverse in this sense can also mean angles in the range of 45° and 135° to the longitudinal axis.

According to a further embodiment of the invention, the undercut is formed by bolts protruding into the journal receptacle, in particular through bolts arranged opposite each other. Through the arrangement of several bolts, for example two bolts, two opposite lying undercuts can be designed, which enable a particularly secure hold of the journal projections in the use position.

According to a further development of the invention, a thread is connected to the undercut in the direction of the free end of the journal. Through the thread, it is possible to use the riveting tools also with previously conventional tool connections, which establish a connection between the riveting tool and riveting tool receptacle by means of a screw thread.

According to a further embodiment of the invention, a riveting tool adapter is arranged between the riveting tool and a riveting tool receptacle, wherein an adapter journal with an adapter journal projection protruding radially with respect to an adapter journal longitudinal axis and surrounding the adapter journal in a maximally annular manner is arranged on a first end of the riveting tool adapter and an adapter journal receptacle with a maximally annularly surrounding adapter undercut is arranged on a second end of the riveting tool adapter lying opposite the first end and the riveting tool adapter arranged between the riveting tool and the riveting tool receptacle is adjustable between an insertion position, in which the adapter journal can be completely introduced into and removed from the journal receptacle and the journal can be completely introduced into and removed from the adapter journal receptacle, and a use position, in which the projection on the journal in the journal longitudinal direction is in operative connection with the adapter undercut and the adapter projection in the adapter journal longitudinal axial direction with the undercut.

In the case of bodies to be riveted with rivets arranged particularly deep in the body, rivet brackets with a particularly large opening width are necessary, which bridge the large distance. However, the distance between the riveting tools (riveting dies) is also very large in the case of such rivet brackets so that a riveting tool adapter is used so that the tool used to operate the riveting tool continues to only need to overcome a short pressing distance to set the rivet.

The adapter journal can be designed according to the designs of the journal described above, the adapter journal longitudinal axis according to the journal longitudinal axis, the adapter journal projection according to the journal projection, the adapter journal receptacle according to the journal receptacles, the adapter undercut according to the undercut and the adapter journal longitudinal axis direction according to the journal longitudinal axis direction.

The adapter journal can thus be connected both with a riveting tool receptacle as well as with a riveting tool. It is also possible to couple together several riveting tool adapters by means of the tool connection, in order to keep the press stroke for setting the rivet short in the case of rivet brackets with a particularly large opening width.

The riveting tool adapter thus has both components of the inventive tool connection, wherein the adapter journal corresponding with the journal is arranged on the first end of the riveting tool adapter and the adapter journal receptacles corresponding with the journal receptacle are arranged on the second end lying opposite the first end.

The riveting tool adapter preferably also has on its first end and/or its second end an adapter tool magnet (tool magnet) corresponding with the designs described above and/or an adapter receptacle magnet (receptacle magnet) and is designed at least partially ferromagnetically.

The adapter journal projection also has particularly preferably an adapter journal contact surface designed identically to the contact surface, that has a slope with respect to the adapter journal length wherein, in the use position of the adapter journal, the adapter journal contact surface and the undercut are in contact on the journal receptacle and a clamp connection is formed between the adapter journal contact surface and the supporting surface or bearing surface.

It is hereby possible to affix the adapter journal in a clamped manner on the riveting tool receptacle without being dependent on the magnetic force, whereby particularly high security is established when working with the riveting tool since a slipping of the riveting tool adapter during the pressing operation is prevented.

Furthermore, the object underlying the invention is solved by a riveting tool for arrangement on a riveting tool receptacle, with a journal, which has a journal projection protruding radially with respect to a journal longitudinal axis and surrounding the journal in a maximally annular manner or a journal receptacle with a maximally annular circumferential undercut.

The design of the riveting tool according to the invention can be designed according to the riveting tool described above for the inventive tool connection and its embodiments, wherein it should be emphasized that the riveting tool is particularly preferably made at least partially of a ferromagnetic material and/or a tool magnet is arranged on the riveting tool.

It should also be noted that a riveting tool is not only a riveting die or other pressing body, but that for example the riveting tool adapter can also be designed as a riveting tool.

Furthermore, the object underlying the invention is solved by a riveting tool receptacle for arranging a riveting tool, with a journal, which has a journal projection protruding radially with respect to a journal longitudinal axis and surrounding the journal in a maximally annular manner or a journal receptacle with a maximally annular circumferential undercut.

The design of the inventive riveting tool can be designed according to the riveting tool receptacle described above for the inventive tool connection and its embodiments, wherein the riveting tool receptacle is particularly preferably made at least partially of a ferromagnetic material and/or a first receptacle magnet is arranged on the riveting tool receptacle.

Furthermore, the object underlying the invention is solved by a riveting tool adapter for connecting a riveting tool with a riveting tool receptacle, with an adapter journal arranged on a first end of the riveting tool adapter, with an adapter journal projection protruding radially with respect to an adapter journal longitudinal axis and surrounding the adapter journal in a maximally annular manner and/or an adapter journal receptacle arranged on a second end of the riveting tool adapter lying opposite the first end, with a maximally annular circumferential adapter undercut.

Just like the riveting tool and the riveting tool receptacle, the riveting tool adapter according to the invention can be designed according to the riveting tool adapter described above for the inventive tool connection and its embodiments.

BRIEF DESCRIPTION OF THE SEVERAL VIEWS OF THE DRAWINGS

Details of the invention are described in great detail below based on figures. The figures show schematically and in a perspective representation.

DETAILED DESCRIPTION OF THE INVENTION

Figure 1:
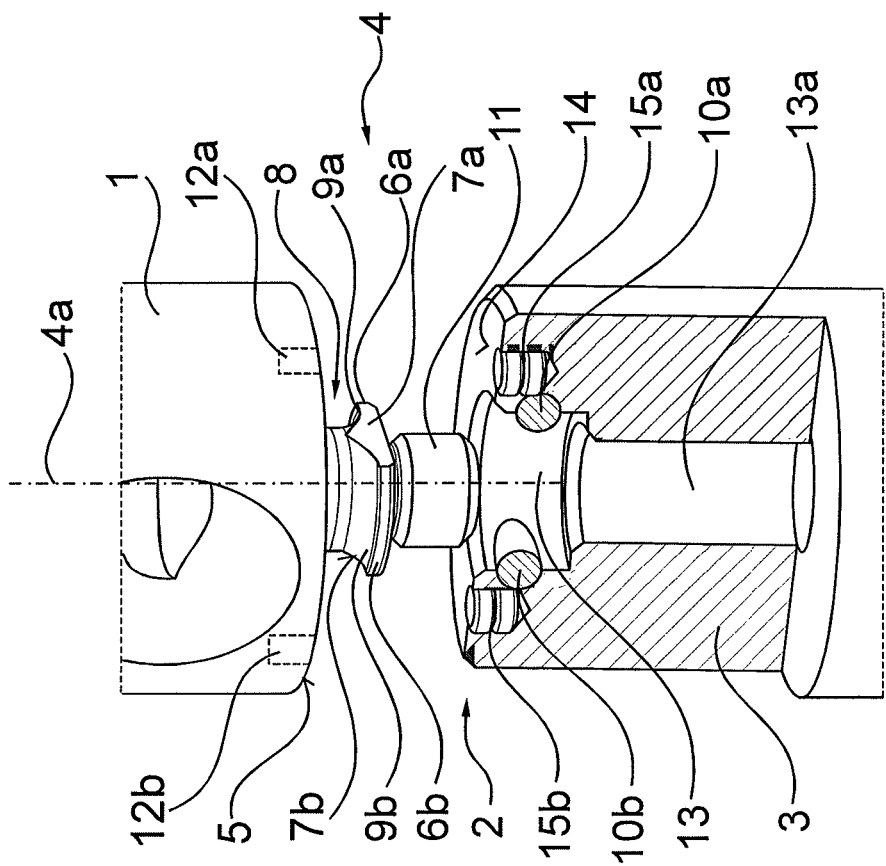
FIG. 1 a partial cross-section through an embodiment of the inventive tool connection.

FIG. 1 shows a tool connection with a riveting die 1 as riveting tool and a riveting tool receptacle 2, which is arranged on a piston rod 3 of a pneumatically driven tool (not shown here). The riveting die 1 can be pushed into the riveting tool receptacle 2 in the shown position.

A journal 4 is arranged on the riveting die 1, which extends perpendicular from a contact surface 5 arranged on the riveting die 1. The journal 4 has two journal projections 6a, 6b, which are arranged diametrically around a journal longitudinal axis 4a, shown here as a dashed line. The width of each journal projection 6a, 6b corresponds with the width of a base body of the journal 4, so that the journal projections 6a, 6b extend respectively by 90° around the journal 4. Respectively one journal flank 7a, 7b is designed between the journal projections 6a, 6b. Furthermore, a journal groove 8 is designed between the journal projections 6a, 6b and the contact surface 5.

Each journal projection 6a, 6b has a contact surface 9a, 9b pointing in the direction of the contact surface 5 and designed as part of the journal groove 8. The contact surfaces 9a, 9b are designed to engage with an undercut arranged on the riveting tool receptacle 2 and designed as bolts 10a, 10b.

A thread 11 is arranged below the journal projections 9a, 9b, i.e. in the journal longitudinal axial direction 4a (shown here as a dashed line), and on the side of the journal projections 9a, 9b lying opposite the contact surfaces 9a, 9b.

The thread 11 is optional and designed for attachment of the riveting die 1 to riveting tool receptacles known from the state of the art.

Furthermore, two tool magnets 12a, 12b, which are indicated by dashed lines, are arranged in the riveting die 1. The tool magnets 12a, 12b are also arranged diametrically around the journal longitudinal axis 4a. The tool magnets 12a, 12b are positioned parallel to the journal flanks 7a, 7b, embedded in the body of the riveting die 1 and are part of the surface of the contact surface 5. Furthermore, the riveting die 1 is made of a ferromagnetic material, here a steel.

A round journal receptacle 13 with a blind-hole-like recess 13a is arranged on the riveting tool receptacle 2. Furthermore, the riveting tool receptacle 2 has a supporting surface 14, which is designed to support the riveting tool 1 with the contact surface 5. Two receptacle magnets 15a, 15b are arranged in the riveting tool receptacle 2 and are designed as part of the supporting surface 14. The receptacle magnets 15a, 15b are arranged diametrically around the journal longitudinal axis 4a and parallel to the bolts 10a, 10b. The bolts 10a, 10b are arranged transversely, in this case 90°, to the journal longitudinal axis.

The bolts 10a, 10b designed as undercuts are embedded into holes, which are embedded in the riveting tool receptacle 2, and clamped in them. The bolts 10a, 10b cut the journal receptacle 13 such that they create a partial narrowing of the diameter of the journal receptacle 13 in the area of the embedded bolts 10a, 10b.

Just like the riveting die 1, the riveting tool receptacle 2 is also made of a ferromagnetic material, here also steel. The receptacle magnets 15a, 15b are also made of neodymium magnets like the tool magnets 12a, 12b.

Figure 2:
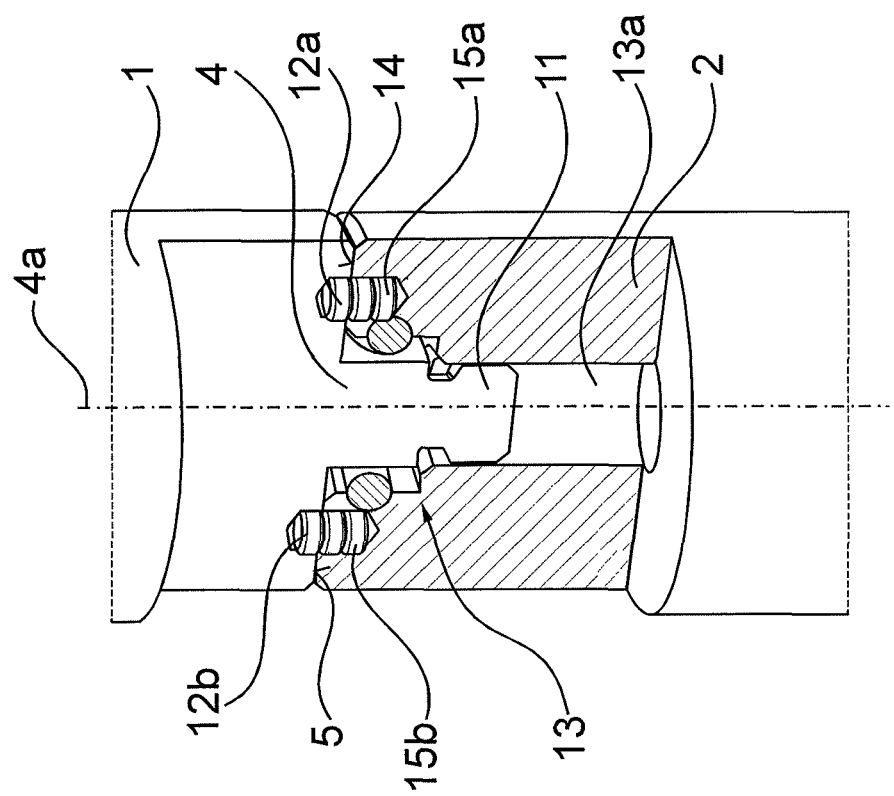
FIG. 2 a cross-section through the embodiment of the tool connection from FIG. 1 with a journal in an insertion position.

FIG. 2 shows in a perspective, schematic cross-section the riveting tool (riveting die) 1 and the riveting tool receptacle 2 from FIG. 1 with the journal 4 fully inserted into the journal receptacle 13. In this insertion position, the thread 11 is pushed without contact into the blink-hole-like recess 13a below the journal receptacle 13. The receptacle magnets 15a, 15b and the tool magnets 12a, 12b are directly adjacent to each other in the longitudinal axial direction.

The contact surface 5 is directly adjacent to the supporting surface 14 so that the riveting tool 1 is supported on the riveting tool receptacle 2. The tool magnets 12a, 12b and the receptacle magnets 15a, 15b are aligned in contact and homopolar with respect to each other, i.e. the tool magnets 12a, 12b and the receptacle magnets 15a, 15b repel each other in the shown insertion position.

In order to fix the riveting tool 1 on the riveting tool receptacle 2, the riveting tool 1 is designed in a rotatable manner into a use position around the journal longitudinal axis 4a.

Figure 3:
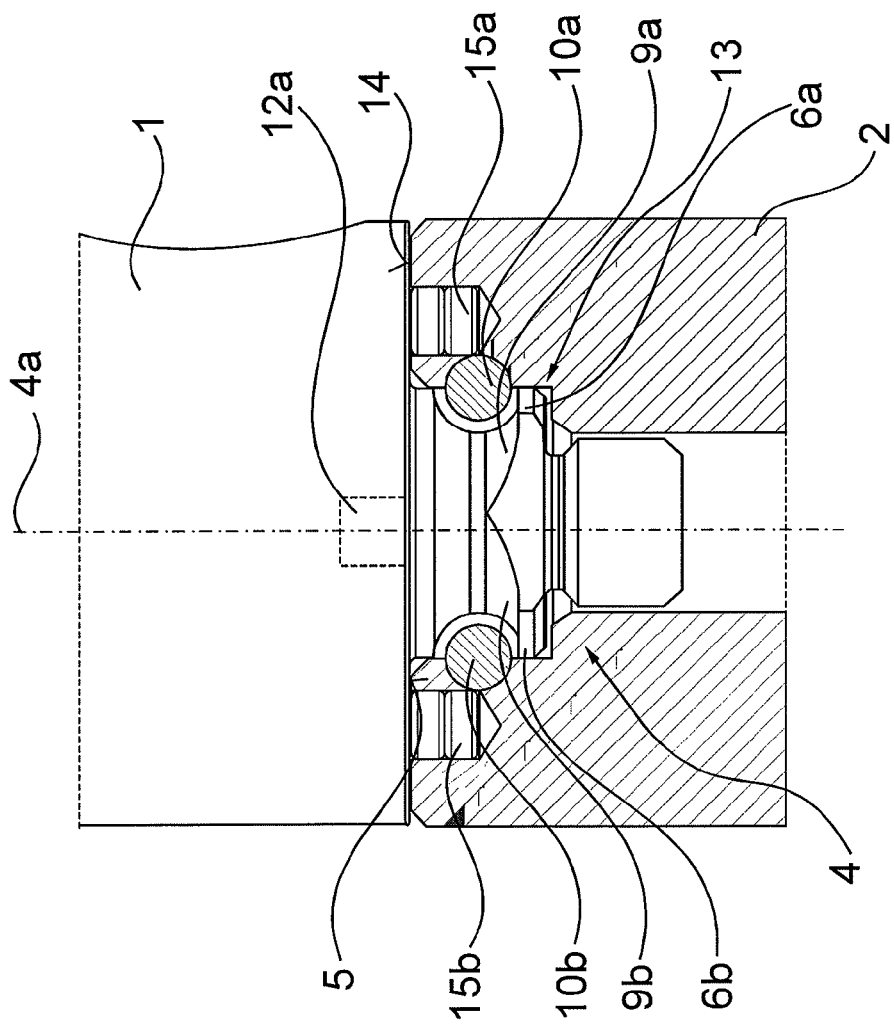
FIG. 3 a partial cross-section through the embodiment of the tool connection from FIG. 1 with a journal in a use position.

FIG. 3 shows in a schematic and perspective view of the riveting tool 1 a partial cross-section through the riveting tool receptacle 2 and the journal 4 in the use position. The riveting die 1 in FIG. 3 is shown turned around the journal longitudinal axis 4a by approx. 85° compared to the position shown in FIG. 2.

The receptacle magnets 15a, 15b are in magnetic operative connection with the ferromagnetically designed riveting die 1 and pull it towards them. The tool magnets 12a, 12b, shown dashed here, are also in magnetic operative connection with the ferromagnetically designed riveting tool receptacle 2 and also pull it towards them so that the contact surface 5 rests in a planar manner on the supporting surface 14.

The journal 4 is completely inserted into the journal receptacle 13. The journal projections 6a, 6b overlap in the direction of the journal longitudinal axis 4*a* with the undercut formed by the two bolts 10*a*, 10*b*. The contact surfaces 9*a*, 9*b* on the journal projections 6*a*, 6*b* are positioned without contact with the bolts 10*a*, 10*b*.

During operation, i.e. when setting a rivet, a pressing force is exerted by the riveting die 1 on the riveting tool receptacle 2 in the direction of the journal longitudinal axis 4*a*. The pressing force is transferred exclusively via the contact surface 5 and the supporting surface 14 between the riveting die 1 and the riveting tool receptacle 2. A loading of the connection between the journal 4 and the undercut 10*a*, 10*b* does not take place during operation. The connection is thus designed in a load-free manner during operation.

When removing the riveting die 1 from the set rivet, the riveting die 1 frequently gets stuck on the rivet head (not shown here) so that an axial tractive force acts on the riveting die 1. In the case of the occurrence of tractive forces that are greater than the influential forces of the magnets 15*a*, 15*b*, 12*a*, 12*b*, the riveting die 1 is pulled from the riveting tool receptacle 2 so that the contact surface 5 and the supporting surface 14 disengage from each other. In the case of the further pulling of the riveting die 1, the contact surfaces 9*a*, 9*b* hit the bolts 10*a*, 10*b* so that a complete separation of the riveting die 1 from the riveting tool receptacle 2 is prevented. As soon as the tractive forces subside, the riveting die 1 is pulled back to the riveting tool receptacle 2 by means of the magnetic forces and positioned correctly.

In order to change the riveting die 1, the riveting die 1 is rotated around the journal longitudinal axis 4*a* until the tool magnets 12*a*, 12*b* and the receptacle magnets 15*a*, 15*b* act on each other magnetically, i.e. they repel each other, whereby the riveting tool 1 is pushed away from the riveting tool receptacle 2 in the journal longitudinal axis direction. A particularly easy removal of the riveting tool 1 from the riveting tool receptacle 2 is hereby possible.

Figure 4:
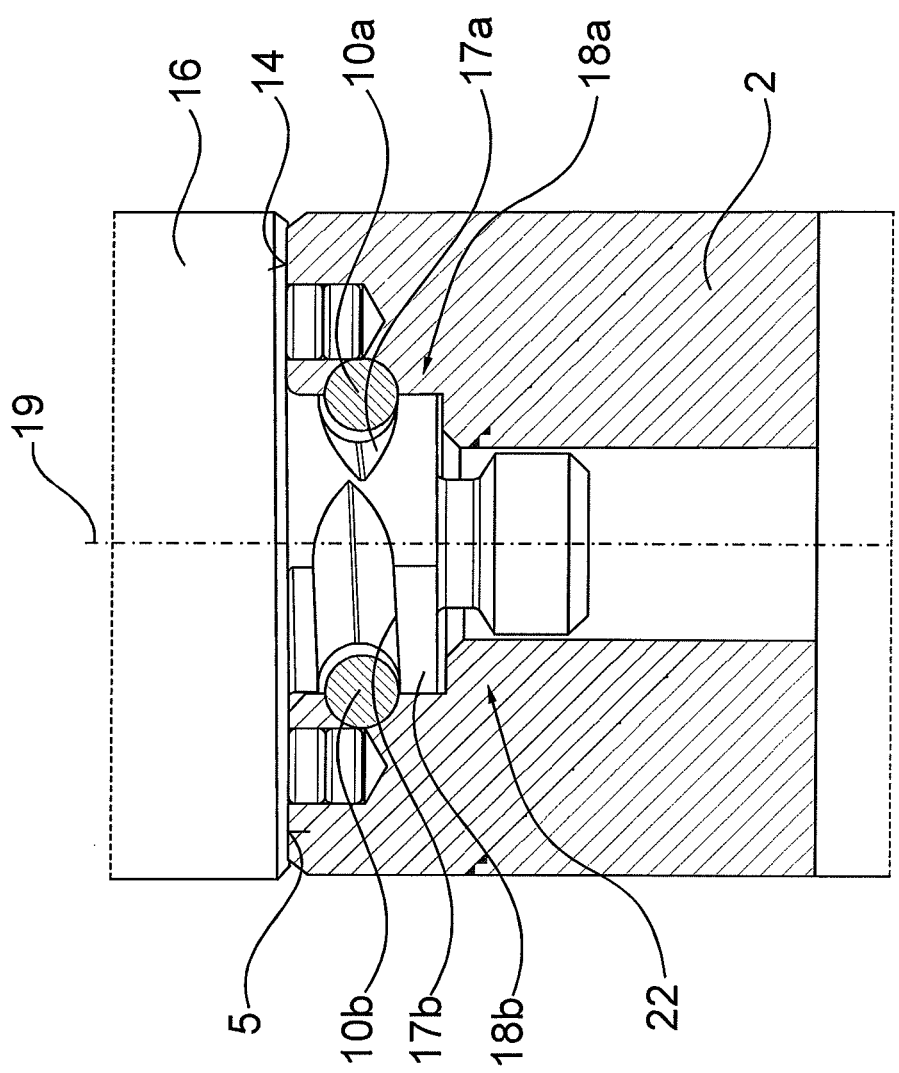
FIG. 4 a partial cross-section through another embodiment of the tool connection with a journal in a use position.

FIG. 4 shows a cross-section through the riveting tool receptacle 2 and, in one view, another embodiment of a riveting tool 16 arranged on the riveting tool receptacle 2 in its use position. The riveting tool receptacle 2 corresponds with the shown designs from FIGS. 1 to 3.

The riveting tool 16 shown in FIG. 4 differs from the riveting die 1 from FIGS. 1 to 3 in the alignment of the contact surfaces 17*a*, 17*b* arranged on the journal projections 18*a*, 18*b* with respect to a journal longitudinal axis 19, shown here as a dashed line. The contact surfaces 17*a*, 17*b* have a slope (an angle >90°) with respect to the journal longitudinal axis 19 so that they are in direct contact with the bolts 10*a*, 10*b* forming the undercut in the use position.

A clamp connection, which clamps the riveting tool 16 firmly with the riveting tool receptacle 2, is thus established in the use position between the contact surfaces 17*a*, 17*b* adjacent to the bolts 20*a*, 20*b* and the supporting surface 14. This alternative embodiment of the riveting tool 16 is preferably used to connect a riveting tool adapter with the riveting tool receptacle 2. This alternative embodiment prevents itself the release of the contact surface 5 from the supporting surface 14 in the case of occurring axial tractive forces (along the journal longitudinal axial direction) in an effective manner.

Figure 5:
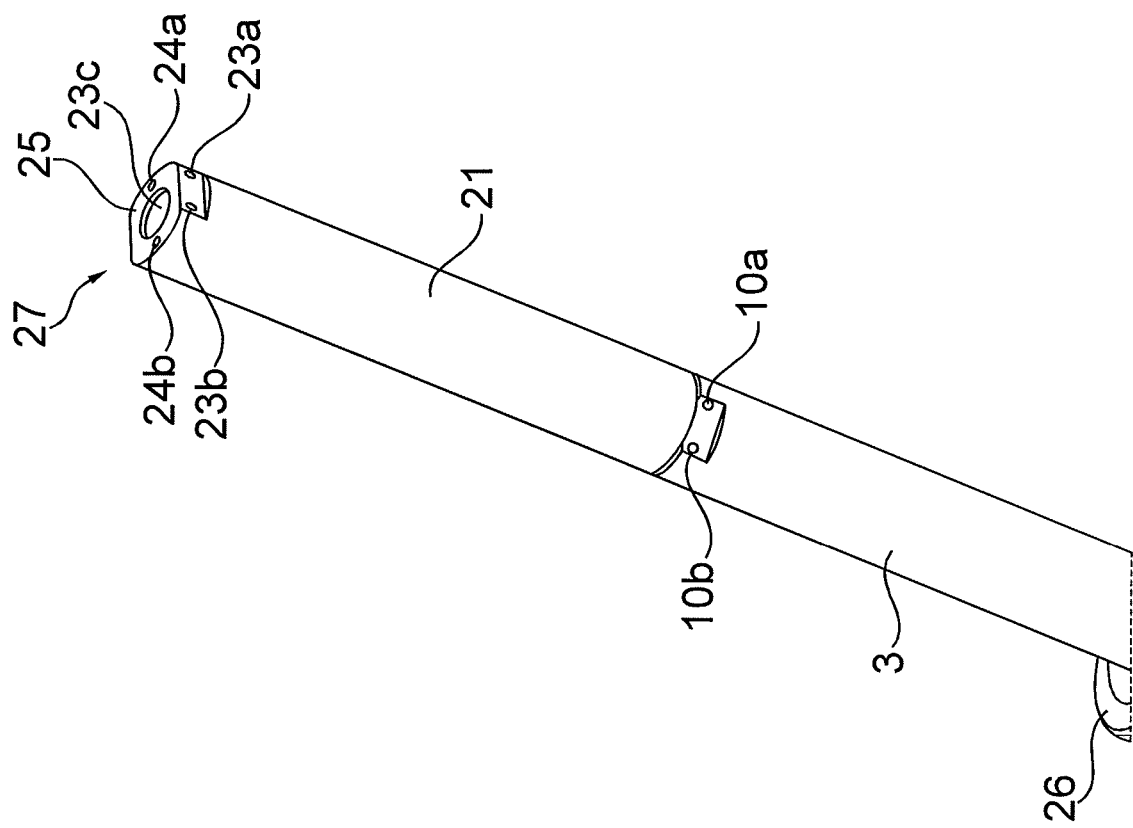
FIG. 5 a view of a riveting tool adapter connected with a pneumatically driven tool with adapter riveting tool receptacle.

FIG. 5 shows in a schematic, perspective view a pneumatically driven tool 26 with a piston rod 3 connection with the tool 26, on which a riveting tool adapter 21 is arranged by means of the tool connection according to the invention (see FIGS. 1-4).

The end of the riveting tool adapter 21 connected with the piston rod 3 has an adapter journal designed according to the journal 22 shown in FIG. 4 with correspondingly designed adapter journal projections (see journal projections 18*a*, 18*b*) and adapter contact surfaces (see contact surfaces 17*a*, 17*b*) and is thus clamped in the use position with the riveting tool receptacle 2 on the piston rod 3.

Furthermore, FIG. 5 shows the bolts 10*a*, 10*b* pushed into the piston rod 3 from the outside and forming the undercut on the riveting tool receptacle of the piston rod 3.

Furthermore, FIG. 5 shows a riveting tool adapter receptacle 27, which is designed identical to the riveting tool receptacle 2 shown in FIGS. 1-3 and is suitable for receiving a riveting die 1 or alternatively another riveting tool adapter 21. Two riveting tool adapter bolts 23*a*, 23*b*, which form the riveting tool adapter undercut 23*c*, pushed and clamped into the riveting tool adapter 21 from the outside, are arranged on the riveting tool adapter receptacle 27. Furthermore, two adapter receptacle magnets 24*a*, 24*b* are positioned in the riveting tool adapter receptacle 27. The adapter receptacle magnets 24*a*, 24*b* are part of the surface of an adapter supporting surface 25 designed for supporting a riveting die (not shown here).

I claim:

1. A tool connection for arranging a riveting tool on a riveting tool receptacle, comprising
   a riveting tool having a contact surface configured to support the riveting tool on a supporting surface on a riveting tool receptacle,
   a journal arranged on one of the riveting tool or the riveting tool receptacle, and a journal receptacle arranged on the other of the riveting tool or the riveting tool receptacle, wherein the journal is introducible into and removable from the journal receptacle and
   wherein the riveting tool is releasably and magnetically locked to the riveting tool receptacle; at least one of the riveting tool and/or the riveting tool receptacle is at least partially ferromagnetic; a tool magnet is arranged on the riveting tool and a receptacle magnet is arranged on the riveting tool receptacle; and the tool magnet and the receptacle magnet repel each other in operative connection.

2. The tool connection according to claim 1, wherein
   the riveting tool is adjustable between an insertion position, in which the journal is completely insertable into or completely removable from the journal receptacle, and
   a use position, in which the journal is fixed in the journal receptacle in a journal longitudinal axial direction.

3. The tool connection according to claim 2, wherein the tool magnet is arranged at least partially in the contact surface and the receptacle magnet is at least partially in the supporting surface.

4. The tool connection according to claim 3, wherein in the use position, the tool magnet exerts an attractive force on the supporting surface of the riveting tool receptacle and the receptacle magnet exerts an attractive force on the contact surface of the riveting tool.

5. A tool connection for arranging a riveting tool on a riveting tool receptacle, comprising:
   a riveting tool having a contact surface configured to support the riveting tool on a supporting surface on a riveting tool receptacle;
   a journal arranged on one of the riveting tool or the riveting tool receptacle, and a journal receptacle arranged on the other of the riveting tool or the riveting tool receptacle, wherein the journal is introducible into and removable from the journal receptacle;

wherein the riveting tool is releasably and magnetically locked to the riveting tool receptacle; at least one of the riveting tool and/or the riveting tool receptacle is at least partially ferromagnetic; a tool magnet is arranged on the riveting tool and a receptacle magnet is arranged on the riveting tool receptacle;

wherein the riveting tool is adjustable between an insertion position, in which the journal is completely insertable into or completely removable from the journal receptacle, and a use position, in which the journal is fixed in the journal receptacle in a journal longitudinal axial direction; and wherein in the insertion position, the tool magnet is arranged in the contact surface such that the tool magnet is in magnetic operative connection with the receptacle magnet.

6. The tool connection according to claim 2, further comprising a journal projection protruding radially with respect to a journal longitudinal axis and surrounding the journal in a maximally annular manner and an undercut surrounding the journal receptacle in a maximally annular manner, wherein in the use position, the journal projection in the journal longitudinal axial direction is in operative connection with the undercut.

7. The tool connection according to claim 6, wherein the journal projection has a contact surface, wherein the contact surface of the journal projection has a slope with respect to the journal longitudinal axis.

8. The tool connection according to claim 2, further having at least two journal projections protruding in a radial manner and spaced from each other and from the journal, wherein the at least two journal projections surround the journal in a maximally annular manner and are arranged in a plane progressing at least mainly perpendicular to a journal longitudinal axis.

9. The tool connection according to claim 8, wherein two journal projections are arranged diametrically on the journal.

10. The tool connection according to claim 6, wherein the undercut is formed by a bolt protruding into the journal receptacle.

11. The tool connection according to claim 10, wherein the bolt extends transversely to a longitudinal axis of the journal receptacle.

12. The tool connection according to claim 6, wherein the undercut is formed by oppositely arranged bolts that protrude into the journal receptacle.

13. The tool connection according to claim 6, wherein a thread connects to the undercut in a direction of a free end of the journal.

14. The tool connection according to claim 1, wherein a riveting tool adapter is arranged between the riveting tool and the riveting tool receptacle, and wherein an adapter journal with an adapter journal projection protruding radially with respect to an adapter journal longitudinal axis and rotating around the adapter journal in a maximally annular manner is arranged on a first end of the riveting tool adapter and an adapter journal with a maximally annular circumferential adapter undercut is arranged on a second end of the riveting tool adapter opposite the first end and wherein the riveting tool adapter is arranged between the riveting tool and the riveting tool receptacle and is adjustable between an insertion position, in which the adapter journal is completely insertable into or completely removable from the journal receptacle and the journal is completely insertable and completely removable from the adapter journal receptacle, and a use position, in which a projection on the journal in a journal longitudinal axial direction is in operative connection with the adapter undercut and the adapter journal projection in an adapter journal longitudinal axial direction is in operative connection with the undercut.

15. The tool connection according to claim 14, wherein an adapter journal contact surface on the adapter journal projection has a slope with respect to the adapter journal longitudinal axis, and wherein in the use position the adapter journal contact surface and the undercut on the journal receptacle are in contact and a clamp connection is formed between the adapter journal contact surface and the supporting surface of the riveting tool receptacle or the contact surface of the riveting tool.

16. A riveting tool for arranging on a riveting tool receptacle, comprising a journal which has a journal projection protruding radially with respect to a journal longitudinal axis and rotating around the journal in a maximally annular manner or a journal receptacle with a maximally annual circumferential undercut;

wherein at least one of: (i) the riveting tool and/or the riveting tool receptacle is made at least partially of a ferromagnetic material, and/or (ii) one of a tool magnet is arranged on the riveting tool and/or a receptacle magnet is arranged on the riveting tool receptacle; and wherein when the tool magnet and receptacle magnet are both present, the tool magnet and the receptacle magnet are arranged such that the receptacle magnet and the tool magnet repel each other in operative connection.

17. A riveting tool adapter for connecting a riveting tool with a riveting tool receptacle, comprising an adapter journal arranged on a first end of the riveting tool adapter with an adapter journal projection protruding radially with respect to an adapter journal longitudinal axis and surrounding the adapter journal in a maximally annular manner and/or an adapter journal receptacle arranged on a second end of the riveting tool adapter lying opposite the first end with a maximally annular circumferential adapter undercut;

wherein the riveting tool adapter has on the first end and/or on the second end an adapter tool magnet and/or an adapter receptacle magnet, and the riveting tool adapter is at least partially ferromagnetic.

* * * * *